(12) United States Patent
Oshima et al.

(10) Patent No.: US 11,493,155 B2
(45) Date of Patent: Nov. 8, 2022

(54) THREADED CONNECTION FOR PIPE AND METHOD FOR PRODUCING THREADED CONNECTION FOR PIPE

(71) Applicants: Nippon Steel Corporation, Tokyo (JP); Vallourec Oil and Gas France, Aulnoye-Aymeries (FR)

(72) Inventors: Masahiro Oshima, Tokyo (JP); Masanari Kimoto, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 239 days.

(21) Appl. No.: 16/754,930

(22) PCT Filed: Oct. 12, 2018

(86) PCT No.: PCT/JP2018/038119
§ 371 (c)(1),
(2) Date: Apr. 9, 2020

(87) PCT Pub. No.: WO2019/074103
PCT Pub. Date: Apr. 18, 2019

(65) Prior Publication Data
US 2020/0292107 A1    Sep. 17, 2020

(30) Foreign Application Priority Data
Oct. 13, 2017    (JP) .............................. JP2017-199005

(51) Int. Cl.
*F16L 15/00*    (2006.01)
*F16L 58/08*    (2006.01)
*F16N 15/00*    (2006.01)

(52) U.S. Cl.
CPC ............. *F16L 15/006* (2013.01); *F16L 58/08* (2013.01); *F16N 15/00* (2013.01)

(58) Field of Classification Search
CPC ..... F16L 15/001; F16L 15/002; F16L 15/004; F16L 15/006; F16L 15/007; F16L 15/009; F16L 15/06; F16L 58/08; F16N 15/00
See application file for complete search history.

(56) References Cited

U.S. PATENT DOCUMENTS 4,630,849 A * 12/1986 Fukui ..................... F16L 15/001
285/55
4,871,194 A * 10/1989 Kawashima ............ F16L 15/00
285/55

(Continued)

FOREIGN PATENT DOCUMENTS

GB    2485360 A    5/2012
JP    2008-069883 A    3/2008

(Continued)

OTHER PUBLICATIONS

English Abstract of JP2008-0698830.
Dec. 25, 2018 (WO) International Search Report PCT/JP2018/038119.

*Primary Examiner* — David Bochna
(74) *Attorney, Agent, or Firm* — Banner & Witcoff, Ltd.

(57) ABSTRACT

A threaded connection for pipe includes a pin and a box. The threaded connection for pipe includes a Zn—Ni alloy plated layer and a solid lubricant coating. The Zn—Ni alloy plated layer is formed on a contact surface of at least one of the pin and the box and contains 10 to 16 mass % of Ni. The solid lubricant coating is formed on the Zn—Ni alloy plated layer. The contact surface on which the Zn—Ni alloy plated layer is formed is ground. Now define arithmetic average roughness of the surface of the Zn—Ni alloy plated layer as Ra1, and arithmetic average roughness of the contact surface as Ra2. Ra1 ranges from 0.1 to 3.2 μm. Ra1 is more than Ra2.

6 Claims, 5 Drawing Sheets

(56) References Cited

U.S. PATENT DOCUMENTS

| | | | | |
|---|---|---|---|---|
| 2003/0066641 A1* | 4/2003 | Yamamoto | ............ | F16L 15/004 |
| | | | | 166/242.6 |
| 2006/0197343 A1* | 9/2006 | Imai | ............ | F16L 15/001 |
| | | | | 285/94 |
| 2008/0277925 A1* | 11/2008 | Goto | ............ | F16L 15/001 |
| | | | | 285/94 |
| 2010/0301600 A1* | 12/2010 | Goto | ............ | F16L 15/004 |
| | | | | 285/333 |
| 2014/0284919 A1* | 9/2014 | Goto | ............ | F16L 15/004 |
| | | | | 285/94 |

FOREIGN PATENT DOCUMENTS

| | | | |
|---|---|---|---|
| JP | 2015-506445 | A | 3/2015 |
| WO | 2016-170031 | A1 | 10/2016 |
| WO | 2016/170037 | A1 | 10/2016 |
| WO | 2017-047722 | A1 | 3/2017 |

\* cited by examiner

THREADED CONNECTION FOR PIPE AND METHOD FOR PRODUCING THREADED CONNECTION FOR PIPE

TECHNICAL FIELD

The present invention relates to a threaded connection for pipe and a method for producing the threaded connection for pipe.

BACKGROUND ART

An oil country tubular goods (OCTG) are used to drill an oil field and a natural gas field. The oil country tubular goods (OCTG) are formed by connecting a plurality of steel pipes to each other in accordance with the depth of a well. The steel pipes are connected to each other by fastening threaded connections for pipe formed in end portions of the steel pipes together. The steel pipes are lifted for inspection and other purposes, loosened, inspected, then fastened again, and used again.

A threaded connection for pipe includes a pin and a box. The pin has a contact surface formed on the outer peripheral surface of an end portion of the steel pipe and including an external threaded part. The box has a contact surface formed on the inner peripheral surface of an end portion of the steel pipe and including an internal threaded part. The contact surfaces each may include a non-threaded metal contact part. The contact surface of each of the pins and the boxes that includes the threaded part and the non-threaded metal contact part repeatedly receives strong friction when the steel pipes undergo the fastening and loosening. If these regions do not have sufficient durability against the friction, galling (unrepairable seizure) occurs when the fastening and loosening are repeated. The threaded connection for pipe therefore requires sufficient durability against the friction, that is, excellent galling resistance.

To improve galling resistance, compound grease containing a heavy metal called a dope has been used. Applying the compound grease onto the surface of a threaded connection for pipe can improve the galling resistance of the threaded connection for pipe. The heavy metal contained in the compound grease, such as Pb, Zn, and Cu, is likely to affect the environment. It is therefore desired to develop a threaded connection for pipe using no compound grease.

International Application Publication No. WO2016/170031 (Patent Literature 1) and Japanese Patent Application Publication No. 2008-69883 (Patent Literature 2) each propose a threaded connection for pipe that excels in galling resistance without compound grease. A lubricant coating is formed on the contact surface (threaded part and the non-threaded metal contact part) of the threaded connection for pipe described in each of the Patent Literatures 1 and 2 in order to increase the galling resistance.

A rust-preventing, galling resistance metal coating is formed on the metal contact part of the pin or the box of the threaded connection for pipe described in Patent Literature 1. The rust-preventing, galling resistance metal coating described above primarily contains Zn. The metal coating described above is formed in an electrolytic plating treatment. The paragraph [0173] of Patent Literature 1 discloses that the electrolytic plating provides a smoothing effect. The smoothing effect is disclosed also in Table 1 in Patent Literature 1. In Table 1 in Patent Literature 1, the arithmetic average roughness Ra of the contact surface after the electrolytic plating is smaller than the arithmetic average roughness Ra of the contact surface before the electrolytic plating irrespective of whether or not sand blasting is performed on the surface.

The threaded connection for pipe described in Patent Literature 2 is formed of a pin and a box each having a contact surface including a threaded part and a non-threaded metal contact part. The threaded connection for pipe described in Patent Literature 2 has the following layers sequentially from below to above on the contact surface of at least one of the pin and the box: a first layer made of a first metal or an alloy; a second layer made of a second metal or an alloy softer than the first metal or an alloy; and a solid lubricant coating that is the uppermost layer.

CITATION LIST

Patent Literature

Patent Literature 1: International Application Publication No. WO2016/170031
Patent Literature 2: Japanese Patent Application Publication No. 2008-69883

SUMMARY OF INVENTION

Technical Problem

A threaded joint needs not only to have the galling resistance described above but to suppress an increase in shouldering torque in a plurality of fastening actions. FIG. 1 is a graph illustrating the relationship between the number of turns of the threaded parts of a threaded connection for pipe having shoulder parts and the torque when fastening the threaded connection for pipe. Referring to FIG. 1, when the pin and the box are fastened together, the shoulder parts of the pin and the box come into contact with each other when a certain number of turns is reached. The torque that occurs at this point is called shouldering torque. To fasten the threaded parts of a threaded connection for pipe together, after the shouldering torque is reached, the fastening is further performed until the fastening is completed. By this means, the gas tightness of the threaded connection for pipe increases. Further fastening after the fastening is completed causes the metal material of which at least one of the pin and the box is made to start being plastically deformed. The torque that occurs at this point is called yield torque.

The torque at the completion of the fastening (hereinafter referred to as fastening torque) is set to provide sufficient sealing interfacial pressure irrespective of the thread interference amount. A sufficient difference between the shouldering torque and the yield torque increases the range within which the fastening torque is achieved. As a result, the fastening torque is readily adjusted. To increase the range within which the fastening torque is achieved, the shouldering torque may be lowered. The threaded connection for pipe therefore needs not only to have the galling resistance described above but to be capable of maintaining the shouldering torque small even when the fastening and loosening are repeated.

The same holds true for a threaded connection for pipe having no non-threaded metal contact part (that is, having no shoulder part). A sufficient difference between the torque in the initial stage of the fastening and the torque in the final stage of the fastening increases the range within which the fastening torque is achieved. As a result, the fastening torque is readily adjusted. To increase the range within which the fastening torque is achieved, the torque in the initial stage of the fastening may be lowered. The torque in the initial stage in the fastening process of a threaded connection for pipe having no non-threaded metal contact part corresponds to the shouldering torque in the fastening process of a threaded connection for pipe including shoulder parts.

Patent Literature 1 or 2, however, does not describe the shouldering torque described above.

On the other hand, forming the lubricant coating on the plated layer can increase the galling resistance of the threaded connection for pipe, as disclosed in Patent Literatures 1 and 2. Patent Literatures 1 and 2 disclose that a blasting treatment or any other treatment performed before the formation of the lubricant coating provides surface roughness. The adhesiveness of the lubricant coating can thus be increased, and the galling resistance of the threaded connection for pipe can therefore be further increased.

The present inventors, however, have assumed that the surface roughness provided in related art in two steps, the blasting treatment and the formation of the plated layer on the blasted surface or the formation of the plated layer and the blasting treatment performed on the plated layer, is preferably provided in only one step of forming the plated layer.

An object of the present invention is to provide a threaded connection for pipe having not only galling resistance that requires no blasting treatment but is as excellent as galling resistance provided by a blasting treatment but small shouldering torque even in the repeated fastening and loosening, and a method capable of producing the threaded connection for pipe.

Solution to Problem

A threaded connection for pipe according to an embodiment of the present embodiment includes a pin and a box. The pin and the box each include a contact surface including a threaded part. The threaded connection for pipe includes a Zn—Ni alloy plated layer and a solid lubricant coating. The Zn—Ni alloy plated layer is formed on the contact surface of at least one of the pin and the box and contains 10 to 16 mass % of Ni. The solid lubricant coating is formed on the Zn—Ni alloy plated layer. The contact surface on which the Zn—Ni alloy plated layer is formed is ground. Now define arithmetic average roughness of a surface of the Zn—Ni alloy plated layer measured under a laser microscope along a direction in which the contact surface is ground as Ra1. And define arithmetic average roughness of the contact surface measured under the laser microscope along the grinding direction as Ra2. The arithmetic average roughness Ra1 ranges from 0.1 to 3.2 μm. The arithmetic average roughness Ra1 is more than the arithmetic average roughness Ra2.

A method for producing a threaded connection for pipe according to the present disclosure is a method for producing a threaded connection for pipe including a pin and a box each having a contact surface including a threaded part. The production method includes a Zn—Ni alloy plated layer formation step and a solid lubricant coating formation step. In the Zn—Ni alloy plated layer formation step, a Zn—Ni alloy plated layer is formed in an electrolytic plating process on the contact surface of at least one of the pin and the box with no blasting treatment performed. The Zn—Ni alloy plated layer contains 10 to 16 mass % of Ni. The Zn—Ni alloy plated layer has arithmetic average surface roughness Ra1 measured under a laser microscope along a direction in which the contact surface is ground and ranging from 0.1 to 3.2 μm. In the solid lubricant coating formation step, a solid lubricant coating is formed on the Zn—Ni alloy plated layer with no blasting treatment performed.

Advantageous Effects of Invention

The threaded connection for pipe according to the present disclosure has not only galling resistance that requires no blasting treatment but is as excellent as galling resistance provided by a blasting treatment but small shouldering torque even in the repeated fastening and loosening. The threaded connection for pipe is produced by using the production method described above.

DESCRIPTION OF EMBODIMENTS

Figure 1:
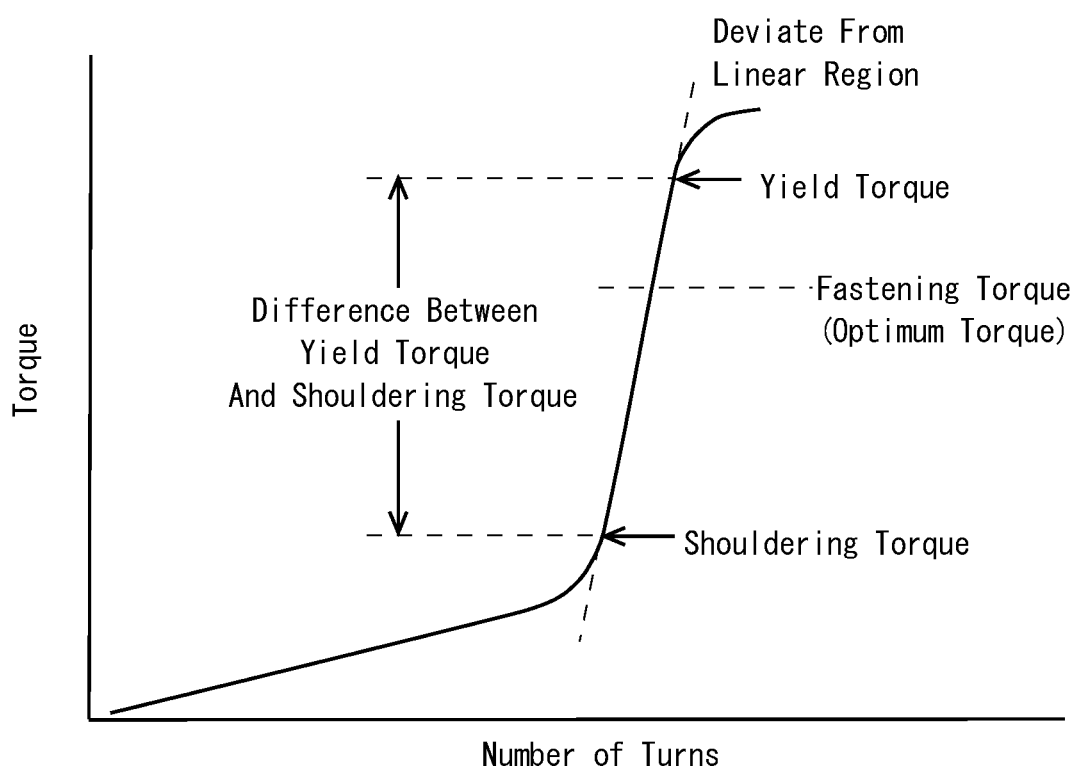
FIG. 1 is a graph illustrating the relationship between the number of turns of threaded parts of a threaded connection for pipe having shoulder parts and torque when fastening the threaded connection for pipe.

The present embodiment will be described below in detail with reference to the drawings. The same portions or corresponding portions in the drawings have the same reference character and will not be repeatedly described.

The present inventors have conducted a variety of studies on the relationship between a blasting treatment and the galling resistance of a threaded connection for pipe and the shouldering torque that occurs in the threaded connection for pipe. As a result, the present inventors have obtained the following findings:

A zinc (Zn) plated layer increases rust prevention capability. A zinc plated layer, however, has hardness and a fusing point lower than those of a copper (Cu) plated layer having been used as the plated layer. Under the backgrounds described above, the present inventors have studied a zinc alloy plated layer that excels in rust prevention capability and has high hardness and a high fusing point. As a result, the present inventors have found that formation of a Zn—Ni alloy plated layer containing 10 to 16 mass % of Ni increases galling resistance along with an increase in the rust prevention capability. A Zn—Ni alloy plated layer containing 10 to 16 mass % of Ni has sufficiently high hardness as compared with Cu and a fusing point much higher than that of Zn. A Zn—Ni alloy plated layer containing 10 to 16 mass % of Ni can therefore increase the galling resistance.

Patent Literature 1 discloses that a Zn—Ni alloy plated layer is formed and a lubricant coating is formed on the Zn—Ni alloy plated layer. Patent Literature 2 discloses no Zn—Ni alloy plated layer but discloses that a plated layer is formed and a solid lubricant coating is formed on the plated layer.

For example, Patent Literature 1 discloses in the paragraph [0160] that a sand blasting treatment is performed on the metal coating to increase the adhesiveness of the lubricant coating on the metal coating. Patent Literature 1 further discloses in the paragraph [0164] that the sand blasting treatment is performed before the metal coating is formed and the metal coating is formed on the blasted surface. Further, Patent Literature 2 discloses in the paragraph [0026] that a shot blasting or sand blasting treatment is performed before the solid lubricant coating is formed to provide an appropriate degree of surface roughness for an increase in the adhesiveness of the solid lubricant coating.

In the case where a plated layer is formed on the surface of a threaded connection for pipe and a lubricant coating is formed on the plated layer, a blasting treatment, such as sand blasting, may performed, as disclosed in the prior documents. The adhesiveness of the lubricant coating can therefore be increased. As a result, the galling resistance of the threaded connection for pipe can be increased. In the present specification, the blasting treatment refers to sand blasting, shot blasting, and grit blasting.

The blasting treatment is performed before the plated layer is formed in some cases and after the plated layer is formed in other cases. To perform the blasting treatment before the plated layer is formed, the blasting treatment is performed directly on each of the contact surfaces, that is, on the surface of a base material. The surface roughness provided on the contact surface decreases to some extent due to the plated layer formed on the contact surface but is maintained also on the surface of the plated layer. The surface roughness on the surface of the plated layer increases the adhesiveness of the lubricant coating on the plated layer. Table 1 in Patent Literature 1 discloses that the surface roughness decreases in typical electrolytic plating.

To perform the blasting treatment after the plated layer is formed, the blasting treatment is performed on the surface of the plated layer.

On the other hand, the present inventors have assumed that the surface roughness provided conventionally in two steps, the blasting treatment and the formation of the plated layer on the blasted surface or the formation of the plated layer and the blasting treatment performed on the plated layer, is preferably provided in only one step of forming the plated layer.

More specifically, the present inventors have assumed that the galling resistance of a threaded connection for pipe can be maintained more satisfactorily even if the blasting treatment is omitted. The present inventors have studied a method for increasing the galling resistance of a threaded connection for pipe almost equal to the galling resistance provided by the blasting treatment even if the blasting treatment is omitted.

Table 1 is a table showing part of an Example and a Reference Example described below. Referring to Table 1, in the Reference Example, the box was prepared by using the conventional method. That is, after sand blasting was performed on one of the contact surfaces, a glossy Zn—Ni alloy plated layer was formed, and a solid lubricant coating was formed on the glossy Zn—Ni alloy plated layer. In the Reference Example, forming the Zn—Ni alloy plated layer caused the arithmetic average roughness $Ra2$ of the contact surface that was 2.700 to decrease to the arithmetic average roughness $Ra1$ of the Zn—Ni alloy plated layer that was 2.680. The threaded connection for pipe still had large galling resistance because the arithmetic average roughness $Ra1$ of the surface of the Zn—Ni alloy plated layer was maintained at the large value of 2.680. Specifically, the fastening and loosening was allowed to be repeated 10 times before galling occurred.

In the case of the test number 2, no sand blasting treatment was performed. The arithmetic average roughness $Ra2$ of the contact surface having the test number 2 therefore had a small value of 0.061. The reason for this is that the contact surface was ground. In the present specification, the grinding refers to grinding for forming the threaded part. The arithmetic average roughness $Ra2$ of the contact surface after grinding had a small value. In the case of the test number 2, the box was prepared in a method different from the conventional method. That is, no sand blasting was performed on the contact surface, but a nonglossy Zn—Ni alloy plated layer was formed, and a solid lubricant coating was formed on the nonglossy Zn—Ni alloy plated layer. As a result, the formation of the nonglossy Zn—Ni alloy plated layer increased the arithmetic average roughness $Ra2$ of the contact surface that was 0.061 to the arithmetic average roughness $Ra1$ of the Zn—Ni alloy plated layer that was 0.276. The galling resistance of the threaded connection for pipe having the test number 2 was large. Specifically, the fastening and loosening was allowed to be repeated 10 times before galling occurred. The galling resistance in the case of the test number 2 was almost equal to the galling resistance in the Reference Example, in which sand blasting was performed.

Based on the study described above, the present inventors obtained the following findings. That is completely different from conventional knowledge, and that is, by forming of a nonglossy Zn—Ni alloy plated layer provides, even if sand blasting is omitted, galling resistance almost equal to the galling resistance in the case where sand blasting is performed is obtained.

TABLE 1

| | | | BOX | | | |
|---|---|---|---|---|---|---|
| TEST NUMBER | PIN Zn—Ni ALLOY PLATING TREATMENT | PRECONDITIONING | ARITHMETIC AVERAGE ROUGHNESS $Ra2$ (μm) OF CONTACT SURFACE | ARITHMETIC AVERAGE ROUGHNESS $Ra1$ (μm) OF Zn—Ni ALLOY PLATED LAYER | SOLID LUBRICANT COATING | GALLING RESISTANCE (NUMBER OF FASTENING AND LOOSENING ACTIONS THAT CAUSED GALLING) |
| 2 | PERFORMED | GRINDING WAS PERFORMED AND LEFT AS IT IS | 0.061 | 0.276 | FORMED | 10 |
| REFERENCE EXAMPLE | PERFORMED | GRINDING AND SAND BLASTING WERE PERFORMED | 2.700 | 2.680 | FORMED | 10 |

In general plating, since a beautiful exterior appearance is preferred in decoration applications, glossy plating having a small amount of surface unevenness is employed in many cases. Further, some glossy plating can achieve further beautiful exterior appearance with the aid of a leveling effect that reduces the unevenness, such as scratches on a substrate.

In contrast, the present inventors have found that a nonglossy Zn—Ni alloy plated layer is effective in the case where the galling resistance of a threaded connection for pipe is taken into account. Formation of a nonglossy Zn—Ni alloy plated layer allows an increase in the arithmetic average roughness Ra1 of the Zn—Ni alloy plated layer and in turn an increase in the galling resistance of the threaded connection for pipe. The arithmetic average roughness Ra1 provided by a nonglossy Zn—Ni alloy plated layer tends to be lower than the arithmetic average roughness Ra1 provided by a surface roughness providing step, such as sand blasting. According to the studies conducted by the present inventors, however, even the arithmetic average roughness Ra1 provided by a nonglossy Zn—Ni alloy plated layer can sufficiently increase the galling resistance of a threaded connection for pipe.

The present inventors have further assumed that high adhesiveness between the solid lubricant coating and the plated layer prevents separation of the solid lubricant coating. Prevention of the separation of the solid lubricant coating allows high lubricity to be maintained even in the repeated fastening and loosening. The shouldering torque that occurs in the threaded connection for pipe can therefore be maintained low even in the repeated fastening and loosening.

Figure 2:
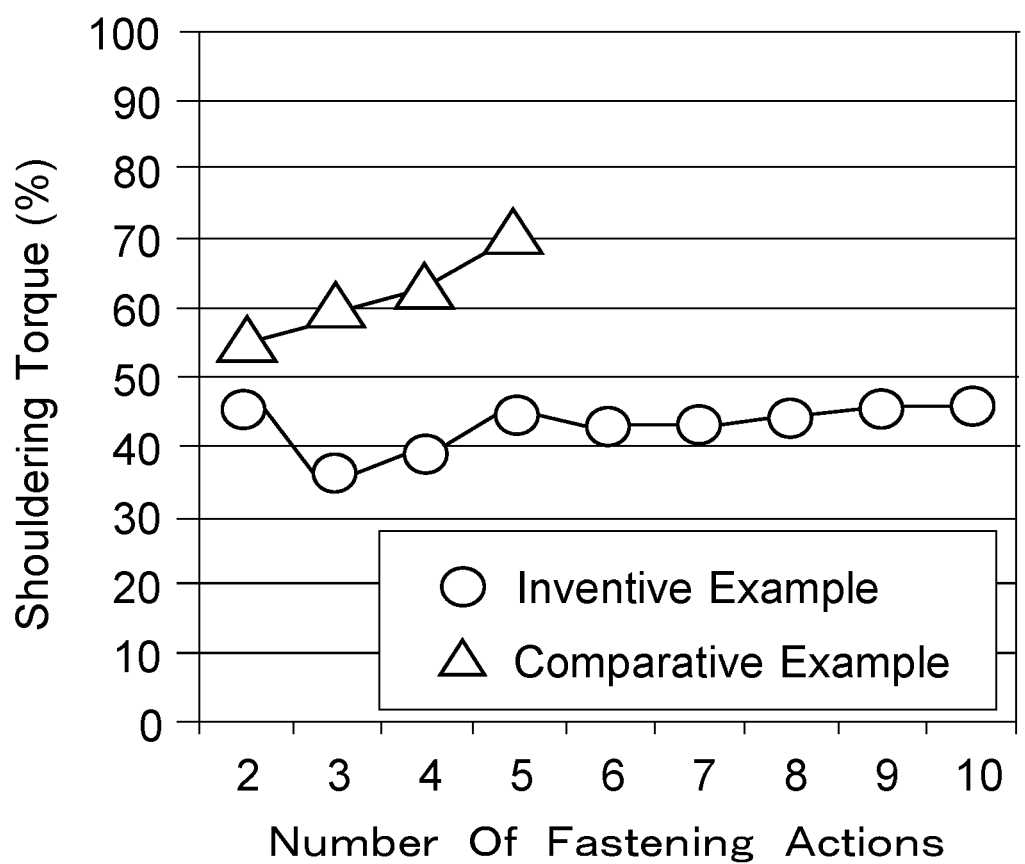
FIG. 2 is a graph illustrating the relationship between the number of actions of fastening a threaded connection for pipe and shouldering torque (%).

FIG. 2 is a graph illustrating the relationship between the number of actions of fastening a threaded connection for pipe and the shouldering torque (%). FIG. 2 was obtained in the Example, which will be described later. The symbol "○" in FIG. 2 represents the results for the test number 2, which is an Inventive Example. In the case of the test number 2, the arithmetic average roughness Ra1 of the Zn—Ni alloy plated layer was 0.276 μm. The symbol "Δ" in FIG. 2 represents the results for the test number 1, which is a Comparative Example. In the case of the test number 1, the arithmetic average roughness Ra1 of the Zn—Ni alloy plated layer was 0.056 μm. Referring to FIG. 2, in the case where the arithmetic average roughness Ra1 of the Zn—Ni alloy plated layer is large to some extent, as in the Inventive Example, the shouldering torque can be maintained low even when the fastening and loosening is repeated. On the other hand, in the case where the arithmetic average roughness Ra1 of the Zn—Ni alloy plated layer is small, as in the Comparative Example, the repeated fastening and loosening increases the shouldering torque, and galling occurs at the fifth fastening in such a way that the contact surfaces are unrepairable. That is, a threaded connection for pipe in which a Zn—Ni alloy plated layer under the solid lubricant coating has arithmetic average roughness Ra1 that is large to some extent can maintain the shouldering torque that occurs in the threaded connection for pipe low even when the fastening and loosening is repeated.

The present inventors have further conducted studies and found that when the arithmetic average roughness Ra1 of the surface of the Zn—Ni alloy plated layer is 0.1 μm or more, not only does the Zn—Ni alloy plated layer increase the galling resistance but the separation of the solid lubricant coating is avoided even when the fastening and loosening is repeated, whereby the fastening torque is readily adjusted. As a result, excellent fastening performance is provided. On the other hand, the present inventors further found that when the arithmetic average roughness Ra1 is more than 3.2 μm, the gas tightness of each of the non-threaded metal contact parts (seal parts) decreases. The arithmetic average roughness Ra1 therefore ranges from 0.1 to 3.2 μm.

The threaded connection for pipe according to the present disclosure attained based on the findings described above includes the pin and the box. The pin and the box each include the contact surface including the threaded part. The threaded connection for pipe includes a Zn—Ni alloy plated layer and a solid lubricant coating. The Zn—Ni alloy plated layer is formed on the contact surface of at least one of the pin and the box and contains 10 to 16 mass % of Ni. The solid lubricant coating is formed on the Zn—Ni alloy plated layer. The contact surface on which the Zn—Ni alloy plated layer is formed is ground. Now define the arithmetic average roughness of the surface of the Zn—Ni alloy plated layer measured under a laser microscope along the direction in which the contact surface is ground as Ra1. And define the arithmetic average roughness of the contact surface measured under the laser microscope along the grinding direction as Ra2. The arithmetic average roughness Ra1 ranges from 0.1 to 3.2 μm. The arithmetic average roughness Ra1 is more than the arithmetic average roughness Ra2.

The threaded connection for pipe according to the present disclosure has a nonglossy Zn—Ni alloy plated layer. The arithmetic average roughness Ra1 of the Zn—Ni alloy plated layer thus increases. That is, the arithmetic average roughness Ra1 of the Zn—Ni alloy plated layer is more than the arithmetic average roughness Ra2 of the contact surface. The adhesiveness of the solid lubricant coating on the Zn—Ni alloy plated layer therefore increases. As a result, even if a blasting treatment is omitted, galling resistance almost equal to the galling resistance in the case where the blasting treatment is performed can be provided. Further, the threaded connection for pipe according to the present disclosure has low shouldering torque even in the repeated fastening and loosening. In the present specification, the grinding refers to grinding for forming the threaded parts. In the present specification, the blasting treatment refers to sand blasting, shot blasting, and grit blasting.

The arithmetic average roughness Ra1 of the surface of the Zn—Ni alloy plated layer described above may range from 0.1 to 0.4 μm.

The contact surface described above may further include a non-threaded metal contact part.

The non-threaded metal contact part includes a metal seal part and the shoulder part.

A method for producing the threaded connection for pipe according to the present disclosure is a method for producing the threaded connection for pipe including the pin and the box each including the contact surface including the threaded part. The production method includes a Zn—Ni alloy plated layer formation step and a solid lubricant coating formation step. In the Zn—Ni alloy plated layer formation step, a Zn—Ni alloy plated layer is formed in an electrolytic plating treatment on the contact surface of at least one of the pin and the box with no blasting treatment performed. The Zn—Ni alloy plated layer contains 10 to 16 mass % of Ni. The arithmetic average roughness Ra1 of the surface of the Zn—Ni alloy plated layer measured under a laser microscope along the direction in which the contact surface is ground ranges from 0.1 to 3.2 μm. In the solid lubricant coating formation step, a solid lubricant coating is formed on the Zn—Ni alloy plated layer with no blasting treatment performed.

In the method for producing a threaded connection for pipe according to the present disclosure, a nonglossy Zn—Ni alloy plated layer is formed with no blasting treatment performed. Further, a solid lubricant coating is formed on the nonglossy Zn—Ni alloy plated layer with no blasting treatment. The production method provides a threaded connection for pipe having galling resistance almost equal to the galling resistance in the case where a blasting treatment is performed and having low shouldering torque even in the repeated fastening and loosening. In the present specification, the blasting treatment refers to sand blasting, shot blasting, and grit blasting. The direction in which the contact surface is ground refers to the grinding direction for formation of the threaded part on the contact surface.

The threaded connection for pipe and the method for producing the threaded connection for pipe according to the present disclosure will be described below in detail.

[Threaded Connection 50 for Pipe]

Figure 3:
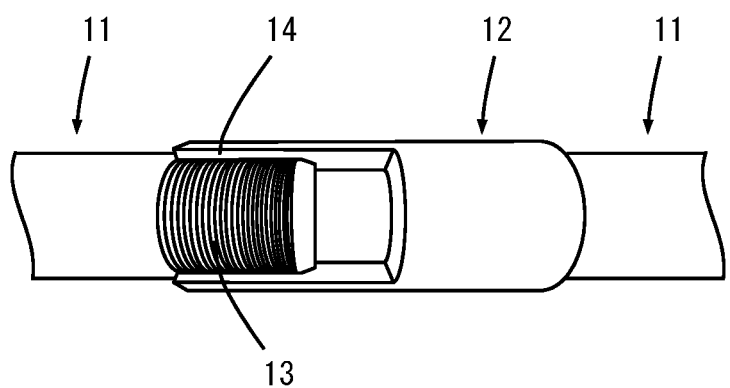
FIG. 3 is a graph illustrating the configuration of a threaded connection for pipe according to the present embodiment.

A threaded connection 50 for pipe includes a pin 13 and a box 14. FIG. 3 shows the configuration of the threaded connection 50 for pipe according to the present embodiment. Referring to FIG. 3, the threaded connection 50 for pipe includes steel pipes 11 and a coupling 12. The pin 13 has an external threaded part formed on the outer surface and is formed on both ends of the steel pipe 11. The box 14 has an internal threaded part formed on the internal surface and is formed on both ends of the coupling 12. Fastening the pins 13 and the boxes 14 together allows the coupling 12 to be attached to the ends of the steel pipes 11. On the other hand, there is an integral threaded joint for oil country tubular goods (OCTG) that uses no coupling 12 with one end of the steel pipe 11 serving as the pin 13 and the other end of the steel pipe 11 serving as the box 14. The threaded connection for pipe according to the present embodiment can be used as both the coupling type threaded connection for pipe and the integral type threaded connection for pipe.

Figure 4:
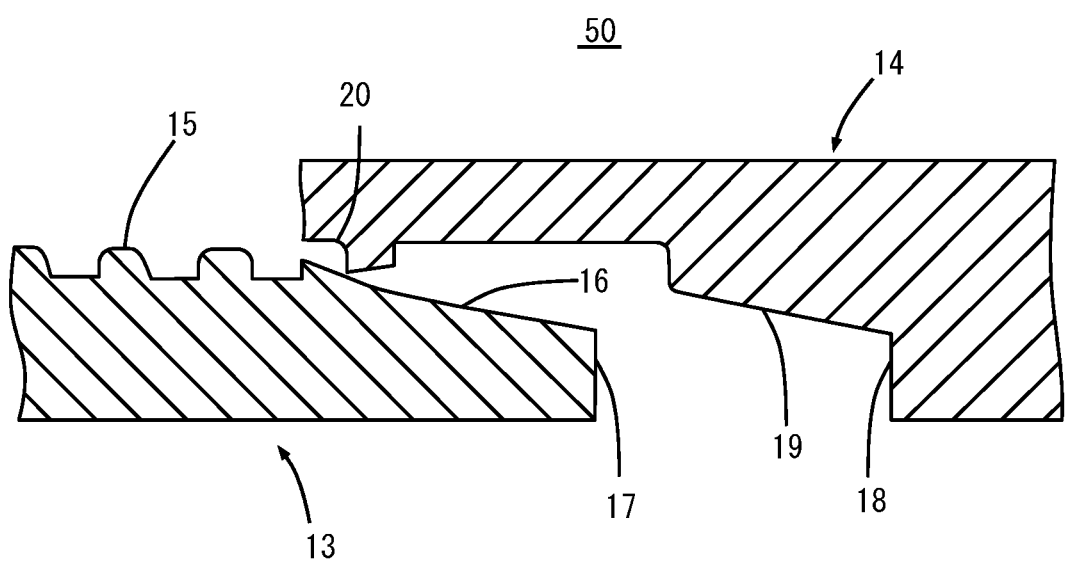
FIG. 4 is a cross-sectional view of the threaded connection for pipe according to the present embodiment.

The pins 13 and the boxes 14 each have the contact surface having the threaded part. FIG. 4 is a cross-sectional view of the threaded connection 50 for pipe according to the present embodiment. Referring to FIG. 4, the pin 13 includes an external threaded part 15 and a non-threaded metal contact part. The non-threaded metal contact part is formed at the front end of the pin 13 and includes a metal seal part 16 and a shoulder part 17. The box 14 includes an internal threaded part 20 and a non-threaded metal contact part. The non-threaded metal contact part is formed in the box 14 and includes a metal seal part 19 and a shoulder part 18. The portion where the pin 13 and the box 14 come into contact with each other when they are fastened together is called the contact surfaces. Specifically, when the pin 13 and the box 14 are fastened together, the shoulder parts (shoulder parts 17 and 18), the metal seal parts (metal seal parts 16 and 19), and the threaded parts (external threaded part 15 and internal threaded part 20) come into contact with each other. That is, the contact surfaces include the shoulder parts, metal seal parts, and the threaded parts.

Although not shown, the threaded connection 50 for pipe may include no non-threaded metal contact part. In this case, the contact surfaces include the threaded parts. Specifically, the pin 13 includes the external threaded part 15. The box 14 includes the internal threaded part 20.

Figure 5:
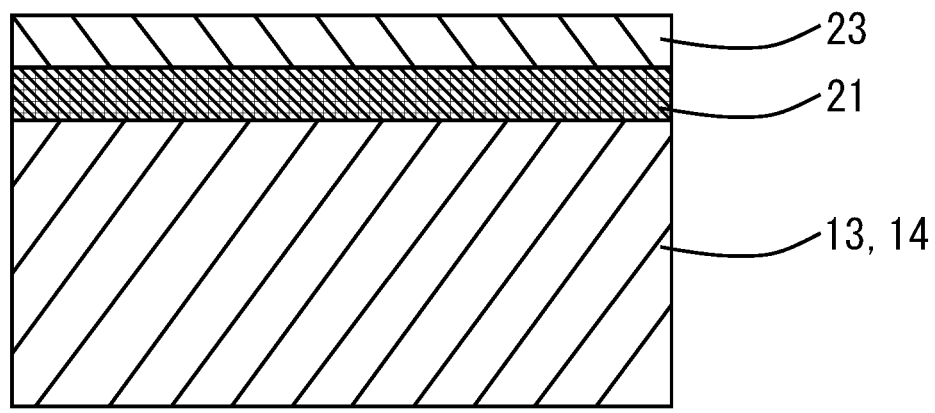
FIG. 5 is a cross-sectional view of a contact surface in the threaded connection for pipe according to the present embodiment.

FIG. 5 is a cross-sectional view of the contact surface of the threaded connection 50 for pipe according to the present embodiment. Referring to FIG. 5, the threaded connection 50 for pipe has a Zn—Ni alloy plated layer 21 and a solid lubricant coating 23 formed on the contact surface of at least one of the pin 13 and the box 14 and sequentially from the contact surface side. Now define the arithmetic average roughness of the surface of the Zn—Ni alloy plated layer 21 measured under a laser microscope along the direction in which the contact surface is ground as Ra1. And define the arithmetic average roughness of the contact surface measured under the laser microscope along the direction in which the contact surface is ground as Ra2. The arithmetic average roughness Ra1, when measured under the laser microscope in the grinding direction, ranges from 0.1 to 3.2 µm. The arithmetic average roughness Ra1 is more than the arithmetic average roughness Ra2.

[Arithmetic Average Roughness Ra2 of Contact Surface]

The arithmetic average roughness Ra2 of the contact surface measured under a laser microscope along the grinding direction is smaller than the arithmetic average roughness Ra1 of the surface of the Zn—Ni alloy plated layer 21, which will be described later, measured under the laser microscope along the grinding direction.

The contact surface is a ground surface. The ground surface means a contact surface ground for formation of the threaded part and left as it is. That is, the ground contact surface means a contact surface having been ground for formation of the threaded part but having no coating formed thereon.

The ground surface of the contact surface is formed by grinding a starting material of the threaded connection 50 for pipe with a grinder or any other tool to form ridges and roots of the thread. The ground surface therefore has ground streaks extending in the grinding direction.

The roughness of the ground surface in the pipe axial direction and the roughness in the grinding direction greatly differ from each other. The roughness in the pipe axial direction, which is measured across the ground streaks, has a large value. In contrast, the roughness in the grinding direction has an extremely small value.

The arithmetic average roughness described in the present specification is measured as the arithmetic average roughness Ra based on JIS B0601 (2001). A contact-type roughness meter is typically used to measure the surface roughness of the threaded connection 50 for pipe. The contact-type roughness meter is, for example, SURFCORDER SEF-30D manufactured by Kosaka Laboratory, Ltd. Measurement with a contact-type roughness meter cause a measured value representing the arithmetic average roughness to be greater than a correct value in some cases. The reason for this is that the measurement is performed only in one direction and the measurement direction is visually adjusted. In this case, an error in the angle at which the roughness meter is placed causes roughness due to the ground streaks to be undesirably measured as the arithmetic average roughness.

The arithmetic average roughness in the present invention is therefore measured with no contact-type roughness meter but under a laser microscope. As the laser microscope, a laser microscope VK-X110 manufactured by KEYENCE Corporation is used. Data measured across a 1.25-mm square at 0.85-µm intervals are collected in the form of a map. A cutoff value $\lambda_c$ and a measurement length for calculation of a roughness curve are picked up from standard values in JIS B0601 (1994). The arithmetic average roughness Ra2 of the contact surface is measured along the direction in which the contact surface is ground. "Along the grinding direction" means along the direction parallel to the ground streaks formed by the grinding for forming the threaded part. The direction parallel to the ground streaks permits errors of ±0.5 degrees on the assumption that the direction parallel to the ground streaks is defined as 0 degrees. When the error is more than ±0.5 degrees, the arithmetic average roughness Ra has a large error. In the present embodiment, the roughness resulting from the ground streaks is not measured as the surface roughness, whereby the surface roughness is more accurately measured. The direction in which the surface roughness is measured is determined based on the result of the mapping observed under the laser microscope.

In the present embodiment, the Zn—Ni alloy plated layer is formed on the contact surface. The arithmetic average roughness Ra2 of the contact surface can therefore also be measured as the contact surface roughness after the Zn—Ni alloy plated layer on the contact surface is separated therefrom. The Zn—Ni alloy plated layer on the contact surface is separated by using hydrochloric acid to which an appropriate amount of a commercially available corrosion inhibitor is added. The commercially available corrosion inhibitor is, for example, product name Ibit 710 manufactured by ASAHI Chemical CO., LTD.

[Zn—Ni Alloy Plated Layer 21]

The Zn—Ni alloy plated layer 21 is formed on the contact surface of at least one of the pin 13 and the box 14. The Zn—Ni alloy plated layer 21 may be formed on the contact surfaces of both the pin 13 and the box 14. The Zn—Ni alloy plated layer 21 may be formed only on the contact surface of the pin 13 or only on the contact surface of the box 14.

The Zn—Ni alloy plated layer 21 is an electrolytically plated layer consisting of a Zn—Ni alloy. The Zn—Ni alloy plated layer 21 has high hardness and a high fusing point. In the case where the Zn—Ni alloy plated layer 21 has high hardness, the plated layer on the contact surface is unlikely to be damaged in the repeated fastening and loosening. Further, in the case where the Zn—Ni alloy plated layer 21 has a high fusing point, the plated layer is unlikely to melt even when a local increase in temperature occurs in the repeated fastening and loosening. The galling resistance of the threaded connection 50 for pipe therefore increases. Further, since Zn contained in the Zn—Ni alloy plated layer 21 is a base metal, the rust prevention capability of the threaded connection 50 for pipe increases.

The Ni content of the Zn—Ni alloy of which the Zn—Ni alloy plated layer 21 is made ranges from 10 to 16 mass %. The composition range described above causes the Zn—Ni alloy to have a almost single γ-phase micro-structure. The thus configured Zn—Ni alloy plated layer 21 has not only rust prevention capability but high hardness and a high fusing point.

A preferable thickness of the Zn—Ni alloy plated layer 21 ranges from 1 to 20 μm. When the Zn—Ni alloy plated layer 21 has a thickness of 1 μm or more, the galling resistance and the rust prevention capability of the threaded connection 50 for pipe can be further stably increased. When the Zn—Ni alloy plated layer 21 has a thickness of 20 μm or less, the adhesiveness of the Zn—Ni alloy plated layer 21 is more stable. The preferable thickness of the Zn—Ni alloy plated layer 21 therefore ranges from 1 to 20 μm. The Zn—Ni alloy plated layer 21 may have a thickness that does not fall within the range. The lower limit of the thickness of the Zn—Ni alloy plated layer 21 is more preferably 3 μm, further preferably 5 μm. The upper limit of the thickness of the Zn—Ni alloy plated layer 21 is more preferably 18 μm, further preferably 15 μm.

[Arithmetic Average Roughness Ra1 of Surface of Zn—Ni Alloy Plated Layer 21]

The arithmetic average roughness Ra1 of the surface of the Zn—Ni alloy plated layer 21 measured under the laser microscope along the grinding direction is more than the arithmetic average roughness Ra2 of the contact surfaces of the pin 13 and the box 14 measured under the laser microscope along the grinding direction. The arithmetic average roughness Ra1, when measured under the laser microscope in the grinding direction, ranges from 0.1 to 3.2 μm.

When the Zn—Ni alloy plated layer 21 has the arithmetic average roughness Ra1 ranging from 0.1 to 3.2 μm, an anchor effect based on the roughness increases the adhesiveness of the solid lubricant coating 23. When the adhesiveness of the solid lubricant coating 23 increases, the galling resistance of the threaded connection 50 for pipe increases. Further, when the adhesiveness of the solid lubricant coating 23 increases, the shouldering torque in the fastening can also be maintained low.

In the case where the arithmetic average roughness Ra1 is less than 0.1 μm, the effects described above are not provided. On the other hand, in the case where the arithmetic average roughness Ra1 is more than 3.2 μm, the gas tightness provided by the non-threaded metal contact part (seal part) decreases. The arithmetic average roughness Ra1 therefore ranges from 0.1 to 3.2 μm. The arithmetic average roughness Ra1 may range from 0.1 to 0.4 μm.

The arithmetic average roughness Ra1 of the surface of the Zn—Ni alloy plated layer 21 can be measured in the same manner in which the arithmetic average roughness Ra2 of the contact surface is measured.

In the present embodiment, formation of the nonglossy Zn—Ni alloy plated layer 21 allows the arithmetic average roughness Ra1 of the surface of the Zn—Ni alloy plated layer 21 to be more than the arithmetic average roughness Ra2 of the contact surface. In this case, even if a blasting treatment is omitted, excellent galling resistance almost equal to the galling resistance in the case where the blasting treatment is performed can be provided.

[Solid Lubricant Coating 23]

The solid lubricant coating 23 is formed on the Zn—Ni alloy plated layer 21 having the arithmetic average roughness Ra1 ranging from 0.1 to 3.2 μm. Since the Zn—Ni alloy plated layer 21 has the arithmetic average roughness Ra1 ranging from 0.1 to 3.2 μm, the adhesiveness between the Zn—Ni alloy plated layer 21 and the solid lubricant coating 23 is high.

The solid lubricant coating 23 increases the lubricity of the threaded connection 50 for pipe. A well-known solid lubricant coating can be used as the solid lubricant coating 23. The solid lubricant coating 23 contains, for example, lubricant particles and a binder. The solid lubricant coating 23 may contain a solvent and other components as required.

The lubricant particles reduce the coefficient of friction at the surface of the solid lubricant coating 23. The lubricant particles are not limited to specific particles and can be any lubricant particles having lubricity. The lubricant particles are, for example, one or more types selected from the group consisting of graphite, $MoS_2$ (molybdenum disulfide), $WS_2$ (tungsten disulfide), BN (boron nitride), PTFE (polytetrafluoroethylene), $CF_x$ (graphite fluoride), and $CaCO_3$ (calcium carbonate). The lubricant particles are preferably one or more types selected from the group consisting of graphite, graphite fluoride, $MoS_2$, and PTFE. The content of the lubricant particles ranges, for example, from 1 to 40 mass % provided that all the components excluding the solvent as 100 mass %.

The binder binds the lubricant particles in the solid lubricant coating 23. The binder is one or two types selected from the group consisting of an organic resin and an inorganic resin. In the case where an organic resin is used, the binder is one or two types selected from the group consisting of a thermosetting resin and a thermoplastic resin. The thermosetting resin is, for example, one or more types selected from the group consisting of an epoxy resin, a polyimide resin, a polyurethane resin, a polycarbodiimide resin, polyether sulphone, a polyether ether ketone resin, a phenol resin, a furan resin, a urea resin, and an acrylic resin. The thermoplastic resin is, for example, one or more types selected from the group consisting of a polyamideimide resin, a polyethylene resin, a polypropylene resin, a polystyrene resin, and an ethylene-vinyl acetate resin.

In the case where an inorganic resin is used as the binder, polymetalloxane can be used. Polymetalloxane refers to a polymer in which repeated metal-oxygen bonds form the main chain skeleton. Polytitanoxane (Ti—O) and polysiloxane (Si—O) are preferably used. These inorganic resins are produced by hydrolysis and condensation of a metal alkoxide. The alkoxy group of a metal alkoxide is, for example, a lower alkoxy group, such as the methoxy group, the ethoxy group, the propoxy group, the isopropoxy group, the isobutoxy group, the butoxy group, and the tert-butoxy group.

That is, the binder is one or more types selected from the group consisting of an epoxy resin, a polyimide resin, a polyurethane resin, a polycarbodiimide resin, polyether sulphone, a polyether ether ketone resin, a phenol resin, a furan resin, a urea resin, an acrylic resin, a polyamideimide resin, a polyethylene resin, a polypropylene resin, a polystyrene resin, an ethylene-vinyl acetate resin, and polymetalloxane. The content of the binder ranges, for example, from 60 to 99 mass % provided that all the components excluding the solvent as 100 mass %.

The solid lubricant coating 23 may contain other components as required. The other components are, for example, one or more types selected from the group consisting of a rust preventer, a corrosion inhibitor, a surfactant, wax, a friction adjuster, pigment, and a solvent. The content of each of the lubricant particles, the binder, and the other components are set as appropriate. The content of the other components is, for example, 10 mass % or less provided that all the components excluding the solvent as 100 mass %.

The solid lubricant coating 23 is formed by applying the composition described above onto the contact surface of at least one of the pin 13 and the box 14 and solidifying the applied composition.

In the case of a threaded connection 50 for pipe with the pin 13 and the box 14 fastened to each other when shipped, the solid lubricant coating 23 may be formed on the contact surface of one of the pin 13 and the box 14 and the pin 13 and the box 14 may then be fastened to each other. In this case, the composition is more readily applied onto the coupling 12, which has a shorter length, than onto the steel pipes 11, which each have a longer length. The solid lubricant coating 23 is therefore preferably formed on the contact surface of the box 14 of the coupling 12. Out of the portions that form the threaded connection 50 for pipe, the pipe leading end portion where the pin 13 and the box 14 are not fastened to each other when shipped may be so configured that the solid lubricant coating 23 is formed on the contact surfaces of both the pin 13 and the box 14 to provide the rust prevention capability along with the lubricity. Instead, the solid lubricant coating 23 may be formed on the contact surface of one of the pin 13 and the box 14, and a solid corrosion preventing coating, which will be described later, may be formed on the contact surface of the other one of the pin 13 and the box 14. In either case, galling resistance, the gas tightness, and the rust prevention capability can be imparted to the threaded connection 50 for pipe.

The solid lubricant coating 23 preferably coats the entire contact surface of at least one of the pin 13 and the box 14. The solid lubricant coating 23 may coat only part of the contact surface (only metal seal parts 16 and 19, for example).

The solid lubricant coating 23 may be a single layer or multiple layers. The multiple layers refer to the state in which two solid lubricant coatings 23 or more are layered on each other from the contact surface side. Two solid lubricant coatings 23 or more can be formed by repeating the application and solidification of the composition. The solid lubricant coating 23 may be directly formed on the contact surface or may be formed after a preconditioning treatment that will be described later is performed.

The solid lubricant coating 23 preferably has a thickness ranging from 5 to 50 μm. When the solid lubricant coating 23 has a thickness of 5 μm or more, high lubricity can be stably provided. On the other hand, when the solid lubricant coating 23 has a thickness of 50 μm or less, stable adhesiveness of the solid lubricant coating 23 is provided. Further, when the solid lubricant coating 23 has the thickness of 50 μm or less, the interfacial pressure that occurs when the threaded parts slide against each other lowers because the tolerance (clearance) of the thread parts at the sliding surface increases. An excessive increase in the fastening torque can therefore be avoided. The solid lubricant coating 23 therefore preferably ranges from 5 to 50 μm. The lower limit of the thickness of the solid lubricant coating 23 is more preferably 8 μm, still more preferably 10 μm. The upper limit of the thickness of the solid lubricant coating 23 is more preferably 40 μm, still more preferably 30 μm.

[Solid Corrosion Preventing Coating]

The threaded connection 50 for pipe described above may include the solid lubricant coating 23 on the contact surface of one of the pin 13 and the box 14 and a solid corrosion preventing coating on the other one of the pin 13 and box 14. The threaded connection 50 for pipe is stored for a long period in some cases until actually used. In this case, formation of the solid corrosion preventing coating increases the rust prevention capability of the pin 13 and the box 14.

The solid corrosion preventing coating is, for example, a chromate coating made of a chromate. The chromate coating is formed in a well-known trivalent chromate treatment.

The solid corrosion preventing coating is not limited to a chromate coating. Another solid corrosion preventing coating contains, for example, an ultraviolet curable resin. In this case, the solid corrosion preventing coating is strong enough not to be broken by force acting thereon when a protector is attached thereto. Further, the solid corrosion preventing coating does not melt even if the temperature reaches the dew point and the solid corrosion preventing coating is therefore exposed to condensed water during the transportation or storage of the threaded connection 50 for pipe. Moreover, the solid corrosion preventing coating does not readily soften even at a high temperature more than 40° C. The ultraviolet curable resin is a known resin composition. The ultraviolet curable resin is not limited to a specific resin and may be any resin that contains a monomer, and an oligomer, and a photopolymerization initiator and starts a photopolymerization reaction when irradiated with ultraviolet rays to form a cured coating.

The plated layer may be formed on the other contact surface of the threaded connection 50 for pipe, and the solid corrosion preventing coating described above may be formed on the plated layer. Instead, the solid corrosion preventing coating may be directly formed on the other contact surface.

[Base Material of Threaded Connection 50 for Pipe]

The composition of the base material of the threaded connection 50 for pipe does not particularly limited. The base material of the threaded connection 50 for pipe is, for example, carbon steel, stainless steel, or alloy steel. Among the alloy steels, duplex stainless steel containing Cr, Ni, Mo, and other alloy elements, and Ni alloy have high rust prevention capability. Therefore, use of any of the types of high alloy steel described above as the base material of the threaded connection 50 for pipe provides excellent rust prevention capability in a corrosive environment containing hydrogen sulfide, carbon dioxide, or any other substance.

[Production Method]

The method for producing the threaded connection 50 for pipe according to the present embodiment will be described below.

The method for producing the threaded connection 50 for pipe according to the present embodiment includes the Zn—Ni alloy plated layer formation step and the solid lubricant coating formation step.

In the present embodiment, a nonglossy Zn—Ni alloy plated layer is formed. The arithmetic average roughness Ra1 of the surface of the Zn—Ni alloy plated layer 21 can therefore be more than the arithmetic average roughness Ra2 of the contact surfaces with no blasting treatment performed. That is, in the threaded connection for pipe producing method according to the present embodiment, sand blasting, shot blasting, and grit blasting are omitted.

[Zn—Ni Alloy Plated Layer Formation Step]

In the Zn—Ni alloy plated layer formation step, a Zn—Ni alloy plating treatment is performed to form a nonglossy Zn—Ni alloy plated layer 21 on the contact surface of at least one of the pin 13 and the box 14 with no blasting treatment performed. The Zn—Ni alloy plated layer 21 may be formed on the contact surfaces of both the pin 13 and the box 14. The Zn—Ni alloy plating treatment is performed by using an electrolytic plating treatment. The electrolytic plating treatment for forming the nonglossy Zn—Ni alloy plated layer 21 is performed by using a well-known method. For example, the electrolytic plating treatment is performed in a manner that the contact surface of at least one of the pin 13 and the box 14 is immersed in a plating bath containing zinc and nickel ions and current is caused. A commercially available nonglossy plating bath can be used. The resultant Zn—Ni alloy plated layer contains 10 to 16 mass % of Ni.

In the present embodiment, performing the nonglossy Zn—Ni alloy plating treatment allows the arithmetic average roughness Ra1 of the surface of the Zn—Ni alloy plated layer 21 to range from 0.1 to 3.2 μm. As a result, an anchor effect based on the roughness increases the adhesiveness of the solid lubricant coating 23. When the adhesiveness of the solid lubricant coating 23 increases, the galling resistance of the threaded connection 50 for pipe increases. Further, when the adhesiveness of the solid lubricant coating 23 increases, the shouldering torque in the fastening can also be maintained low.

In the Zn—Ni alloy plated layer formation step, the content of the nickel ion in the plating bath for forming the nonglossy Zn—Ni alloy plated layer 21, for example, ranges from 12 to 60 mass % as the content ratio between the zinc ion and the nickel ion. More specifically, the composition of the plating bath for forming the nonglossy Zn—Ni alloy plated layer 21 contains, for example, zinc: 20 g/L, nickel chloride: 21 g/L, ammonium chloride: 240 g/L, and an addition agent: 100 ml/L. In this case, the content of the nickel ion is 12.0 mass %. The addition agent is, for example, product name DAIN Zinalloy AD2 manufactured by Daiwa Fine Chemicals Co., Ltd. (Laboratory). Use of the plating bath having the composition described above allows formation of the nonglossy Zn—Ni alloy plated layer 21 having the arithmetic average roughness Ra1 ranging from 0.1 to 3.2 μm. Use of the plating bath having the composition described above further allows the arithmetic average roughness Ra1 of the surface of the Zn—Ni alloy plated layer 21 to be more than the arithmetic average roughness Ra2 of the contact surfaces. The composition of the plating bath for forming the nonglossy Zn—Ni alloy plated layer 21 is not limited to the composition described above and can be set as appropriate to the extent that the nonglossy Zn—Ni alloy plated layer 21 can be produced.

The conditions of the electrolytic plating treatment can be set as appropriate. Examples of the electrolytic plating treatment conditions may include the pH of the plating bath: 1 to 10, the temperature of the plating bath: 10 to 60° C., the current density: 1 to 100 A/dm$^2$, and the treatment period: 0.1 to 30 minutes. The thickness of the Zn—Ni alloy plated layer 21 preferably ranges from 1 to 20 μm, as described above.

[Solid Lubricant Coating Formation Step]

After the Zn—Ni alloy plated layer formation step, the solid lubricant coating formation step is carried out. In the solid lubricant coating formation step, a solid lubricant coating composition (hereinafter also referred to as composition) is first prepared. The composition is formed by mixing the lubricant particles and the binder described above. The composition may further contain the solvent and other components described above.

The resultant composition is applied onto the Zn—Ni alloy plated layer 21. The application method is not limited to a specific method. For example, a spray gun is used to spray the composition in a solvent onto the Zn—Ni alloy plated layer 21. In this case, the composition is uniformly applied onto the Zn—Ni alloy plated layer 21. The pin 13 or the box 14 onto which the composition has been applied is dried or heated and dried. The heating and drying can, for example, be performed by using a commercially available heated air drier. By this means, the composition solidifies and the solidified composition forms the solid lubricant coating 23 on the Zn—Ni alloy plated layer 21. The heating and drying conditions can be set as appropriate in consideration of the boiling point, the fusing point, and other factors of each of the components contained in the composition.

To form the solid lubricant coating 23 by using a composition using no solvent, a hot melt method can, for example, be used. In the hot melt method, the composition is heated into a fluid state. A spray gun having a temperature maintaining function is, for example, used to spray the composition in the fluid state. The composition is thus uniformly applied onto the Zn—Ni alloy plated layer 21. The temperature to which the composition is heated can be set as appropriate in consideration of the fusing point and the softening temperature of the binder and other components described above. The pin 13 or the box 14 onto which the composition has been applied is air cooled or otherwise cooled. The composition thus solidifies to form the solid lubricant coating 23 on the Zn—Ni alloy plated layer 21.

[Formation of Solid Corrosion Preventing Coating (Trivalent Chromate Treatment)]

The Zn—Ni alloy plated layer formation step and the solid lubricant coating formation step may be carried out on the contact surface of one of the pin 13 and the box 14 to form the Zn—Ni alloy plated layer 21 and the solid lubricant coating 23, as described above.

On the other hand, the Zn—Ni alloy plated layer 21 and the solid lubricant coating 23 or the Zn—Ni alloy plated layer 21 and/or the solid corrosion preventing coating may be formed on the contact surface of the other one of the pin 13 and the box 14. The following description will be made for the case where the Zn—Ni alloy plated layer 21 and a solid corrosion preventing coating formed of a chromate coating are formed on the other contact surface.

In this case, the Zn—Ni alloy plated layer formation step described above is carried out to form the Zn—Ni alloy plated layer 21. After the Zn—Ni alloy plated layer formation step, a trivalent chromate treatment is performed to form a solid corrosion preventing coating. The trivalent chromate treatment is a treatment for forming a coating of trivalent-chromium-based chromate (chromate coating). The chromate coating formed in the trivalent chromate treatment prevents white rust on the surface of the Zn alloy plated layer. The exterior appearance of the product is therefore improved. The trivalent chromate treatment can be performed by using a well-known method. For example, the contact surface of at least one of the pin 13 and the box 14 is immersed in a chromate treatment liquid, or a chromate treatment liquid is sprayed and applied onto the contact surface. The contact surface is then rinsed. Instead, the contact surface may be rinsed after the contact surface is immersed in the chromate treatment liquid and current is caused to flow therethrough. Still instead, the chromate treatment liquid may be applied onto the contact surface and then heated and dried. The trivalent chromate treatment conditions can be set as appropriate.

[Preparation Step]

The production method described above may include a preparation step before the Zn—Ni alloy plated layer formation step as required. The preparation step is, for example, pickling and alkali degreasing. In the preparation step, grease and other substances having adhered to the contact surface are removed. The preparation step may further include grinding, such as mechanical grinding as a finishing treatment. Grinding, such as mechanical grinding as a finishing treatment, used herein refers to reduction in surface roughness by cutting.

The threaded connection 50 for pipe according to the present embodiment is produced by carrying out the production steps described above.

EXAMPLE

Bellow, Example will be described. It is, however, noted that Example does not limit the present invention. In Example, the contact surface of the pin 13 is referred to as a pin surface, and the contact surface of the box 14 is referred to as a box surface. Further, the symbol % in Example means mass % unless otherwise particularly specified.

In present Example, product name SM13CRS-110 of VAM21 (registered trademark) manufactured by NIPPON STEEL & SUMITOMO METAL CORPORATION was used. Product name SM13CRS-110 of VAM21 (registered trademark) is a threaded connection for pipe having an external diameter of 177.80 mm (7 inches) and a wall thickness of 11.506 mm (0.453 inches). The steel type was 13Cr steel. The composition of 13Cr steel was as follows: C: 0.03% or less; Si: 0.5% or less, Mn: 0.5% or less, Ni: 5.0 to 6.5%, Cr: 11.5 to 13.5%, Mo: 1.5 to 3.0%; and the balance: Fe and impurities.

Mechanical grinding as a finishing treatment was performed on the pin surface and the box surface of each test number. Table 1 shows the arithmetic average roughness Ra2 of the contact surface of each test number. The arithmetic average roughness Ra2 was measured based on JIS B0601 (2001). The laser microscope VK-X110 manufactured by KEYENCE Corporation was used to measure the arithmetic average roughness Ra. Data measured across a 1.25-mm square at 0.85-μm intervals were collected in the form of a map. The cutoff value $\lambda_c$ and the measurement length for calculation of a roughness curve were picked up from standard values in JIS B0601 (1994). The arithmetic average roughness was measured along the grinding direction.

The Ni content of the Zn—Ni alloy plated layer 21 ranged from 10 to 16 mass %.

TABLE 2

| TEST NUMBER | PIN Zn—Ni ALLOY PLATING TREATMENT | BOX PRECONDITIONING | BOX ARITHMETIC AVERAGE ROUGHNESS Ra2 (μm) OF CONTACT SURFACE | BOX ARITHMETIC AVERAGE ROUGHNESS Ra1 (μm) OF Zn—Ni ALLOY PLATED LAYER | BOX SOLID LUBRICANT COATING | GALLING RESISTANCE (NUMBER OF FASTENING AND LOOSENING ACTIONS THAT CAUSED GALLING) |
|---|---|---|---|---|---|---|
| 1 | PERFORMED | GRINDING WAS PERFORMED AND LEFT AS IT IS | 0.061 | 0.056 | FORMED | 5 |
| 2 | PERFORMED | GRINDING WAS PERFORMED AND LEFT AS IT IS | 0.061 | 0.276 | FORMED | 10 |
| REFERENCE EXAMPLE | PERFORMED | GRINDING AND SAND BLASTING WERE PERFORMED | 2.700 | 2.680 | FORMED | 10 |

The plating layer and the coating were formed as follows:

[Test Number 1]

In the case of the test number 1, glossy Zn—Ni electrolytic plating was performed on the surfaces of the pin 13 and the box 14 to form a glossy Zn—Ni alloy plated layer 21 having a thickness of 10 μm. The electrolytic plating was performed under the following conditions: the pH of the plating bath: 6.5; the temperature of the plating bath: 25° C.; the current density: 2 A/dm$^2$; and the treatment period: 18 minutes. The composition of the plating liquid was as follows: Zn: 5 g/L; Ni: 24 g/L; ammonium chloride: 206 g/L; boric acid: 120 g/L; and an addition agent: 20 mL/L. The addition agent was product name DAIN Zinalloy AD1 manufactured by Daiwa Fine Chemicals Co., Ltd. (Laboratory). The composition of the glossy Zn—Ni alloy plated layer 21 was as follows: Zn: 87%; and Ni: 13%. The arithmetic average roughness Ra after the glossy Zn—Ni alloy plating treatment was measured by using the same measurement method used to measure the arithmetic average roughness Ra2 of the contact surfaces. $\lambda_c$ was 0.25 mm, and the measurement length was 0.67 mm. For the box 14, the solid lubricant coating 23 was formed thereon. The solid lubricant coating 23 was a commercially available thermosetting epoxy resin coating. The solid lubricant coating 23 had a film thickness of 25 μm.

[Test Number 2]

In the case of the test number 2, nonglossy Zn—Ni electrolytic plating was performed on the surfaces of the pin 13 and the box 14 to form a nonglossy Zn—Ni alloy plated layer 21 having a thickness of 10 μm. The electrolytic plating was performed under the following conditions: the pH of the plating bath: 5.5; the temperature of the plating bath: 35° C.; the current density: 6 A/dm$^2$; and the treatment period: 400 seconds. The composition of the plating liquid was as follows: Zn: 25 g/L; Ni: 28 g/L; ammonium chloride: 240 g/L; and an addition agent: 100 mL/L. The addition agent was product name DAIN Zinalloy AD2 manufactured by Daiwa Fine Chemicals Co., Ltd. (Laboratory). The composition of the nonglossy Zn—Ni alloy plated layer 21 was as follows: Zn: 87%; and Ni: 13%. The arithmetic average roughness Ra after the nonglossy Zn—Ni alloy plating treatment was measured by using the same measurement method used to measure the arithmetic average roughness Ra2 of the contact surfaces. $\lambda_c$ was 0.8 mm, and the measurement length was 1.25 mm. For the box 14, the solid lubricant coating 23 was formed thereon. The solid lubricant coating 23 was the commercially available thermosetting epoxy resin coating. The solid lubricant coating 23 had the film thickness of 25 μm.

REFERENCE EXAMPLE

In Reference Example, a sand blasting treatment was performed on the surface of the box 14. The arithmetic average roughness Ra2 of the surface of the sand-blasted box 14 was measured by using the method described above. The cutoff value $\lambda_c$ and the measurement length for calculation of a roughness curve were picked up from standard values in JIS B0601 (1994). The arithmetic average roughness was measured along the grinding direction. Glossy Zn—Ni electrolytic plating was performed on the surfaces of the pin 13 and the box 14 to form a glossy Zn—Ni alloy plated layer 21 having a thickness of 10 μm. The electrolytic plating was performed under the following conditions: the pH of the plating bath: 6.5; the temperature of the plating bath: 25° C.; the current density: 2 A/dm$^2$; and the treatment period: 18 minutes. The composition of the plating liquid was as follows: Zn: 5 g/L; Ni: 24 g/L; ammonium chloride: 206 g/L; boric acid: 120 g/L; and an addition agent: 20 mL/L. The addition agent was product name DAIN Zinalloy AD1 manufactured by Daiwa Fine Chemicals Co., Ltd. (Laboratory). The composition of the glossy Zn—Ni alloy plated layer 21 was as follows: Zn: 87%; and Ni: 13%. The arithmetic average roughness Ra after the Zn—Ni alloy plating treatment was measured by using the same measurement method used to measure the arithmetic average roughness Ra2 of the contact surfaces. The cutoff value $\lambda_c$ and the measurement length for calculation of a roughness curve were picked up from standard values in JIS B0601 (1994). The arithmetic average roughness was measured along the grinding direction. For the box 14, the solid lubricant coating 23 was formed thereon. The solid lubricant coating 23 was the commercially available thermosetting epoxy resin coating. The solid lubricant coating 23 had the film thickness of 25 μm.

The galling resistance and the shouldering torque were evaluated. In Reference Example, only the galling resistance was evaluated, but the shouldering torque was not evaluated.

[Galling Resistance Evaluation Test]

The galling resistance evaluation test was performed in compliance with ISO 13679 (2011). Specifically, the pins 13 and the boxes 14 of the test numbers 1 and 2 were fastened together in a hand-tight manner (fastened by human power) until the threaded parts engage with each other in an initial fastening stage. After the hand-tight fastening, a power tong was used to repeat the fastening and loosening to evaluate the galling resistance. The surfaces of the pins 13 and the surfaces of the boxes 14 were visually observed whenever the fastening and loosening were performed once. Whether the galling had occurred was checked in the visual observation. In a case where the degree of galling was small and the surface was therefore repairable, the galling streaks were repaired, and the test was resumed. The number of fastening and loosening actions at the point of time when galling occurred in such a way that the surface was unrepairable was measured. The result of the measurement was shown in the "galling resistance" field in Table 2.

[Shouldering Torque Measurement Test]

The pins 13 and the boxes 14 of the test numbers 1 and 2 were fastened together, and the number of fastening actions (one fastening and loosening action was counted as one fastening action) and the torque were measured. The measured number of turns and torque were plotted to determine the shouldering torque. The fastening and loosening (fastening) was repeated, and the shouldering torque was measured for each time. The resultant shouldering torque was used to calculate the ratio of the shouldering torque to target fastening torque (ShT %). The target fastening torque was set at a fixed value. Table 3 shows the results of the calculation. In the case of the test number 1, galling occurred in such a way that the contact surface was unrepairable at the fifth fastening and loosening, after that the following tests were therefore not performed.

TABLE 3

| NUMBER OF FASTENING ACTIONS | ShT (%) | |
| --- | --- | --- |
| | TEST NUMBER 1 | TEST NUMBER 2 |
| 1 | 48.8 | 53.0 |
| 2 | 55.4 | 45.0 |
| 3 | 60.9 | 36.0 |
| 4 | 64.1 | 39.0 |
| 5 | 70.7 | 43.0 |
| 6 | — | 42.0 |
| 7 | — | 42.0 |
| 8 | — | 43.0 |
| 9 | — | 44.0 |
| 10 | — | 44.0 |

[Evaluation Results]

In the case of the test number 2, the nonglossy Zn—Ni alloy plated layer 21 was formed. No surface roughness providing step, such as sand blasting, was therefore carried out, but the arithmetic average roughness Ra1 of the surface of the Zn—Ni alloy plated layer 21 ranged from 0.1 to 3.2 μm. As a result, the galling resistance was 10, which is a large value. The galling resistance in the case of the test number 2 is almost equal to the galling resistance provided in Reference Example, in which sand blasting was performed. Further, in the case of the test number 2, in which the nonglossy Zn—Ni alloy plated layer 21 was formed with no sand blasting treatment performed, the arithmetic average roughness Ra1 of the surface of the Zn—Ni alloy plated layer 21 was more than the arithmetic average roughness Ra2 of the contact surface. Moreover, in the case of the test number 2, the shouldering torque was maintained at a value lower than the shouldering torque in the case of the test number 1 also after the fastening and loosening was repeated.

In the case of the test number 1, in which the glossy Zn—Ni alloy plated layer 21 was formed, the arithmetic average roughness Ra1 of the surface of the Zn—Ni alloy plated layer 21 was less than 0.1 μm. The galling resistance was therefore poor. Further, in the case of the test number 1, the shouldering torque increased as the fastening and loosening was repeated.

The embodiment of the present invention has been described above. The embodiment described above is, however, merely an example for implementation of the present invention. The present invention is therefore not limited to the embodiment described above, and the embodiment described above can be changed as appropriate to the extent that the change does not depart from the substance of the present invention and implemented in the changed form.

REFERENCE SIGNS LIST

11 Steel pipe
12 Coupling
13 Pin
14 Box
15 External threaded part
16, 19 Metal seal part
17, 18 Shoulder part
20 Internal threaded part
21 Zn—Ni alloy plated layer
23 Solid lubricant coating
50 Threaded connection for pipe

The invention claimed is:

1. A threaded connection for pipe including a pin and a box each including a contact surface including a threaded part, the threaded connection for pipe comprising:
   a Zn—Ni alloy plated layer formed on the contact surface of at least one of the pin and the box and containing 10 to 16 mass % of Ni; and
   a solid lubricant coating formed on the Zn—Ni alloy plated layer,
   wherein the contact surface on which the Zn—Ni alloy plated layer is formed is ground, and
   when arithmetic average roughness of a surface of the Zn—Ni alloy plated layer measured under a laser microscope along a direction in which the contact surface is ground is defined as Ra1, and
   arithmetic average roughness of the contact surface measured under the laser microscope along the grinding direction is defined as Ra2,
   the arithmetic average roughness Ra1 ranges from 0.1 to 3.2 μm, and
   the arithmetic average roughness Ra1 is more than the arithmetic average roughness Ra2.

2. The threaded connection for pipe according to claim 1, wherein the arithmetic average roughness Ra1 ranges from 0.1 to 0.4 μm.

3. The threaded connection for pipe according to claim 2, wherein the contact surfaces each further include a non-threaded metal contact part.

4. The threaded connection for pipe according to claim 1, wherein the contact surfaces each further include a non-threaded metal contact part.

5. A method for producing a threaded connection for pipe including a pin and a box each including a contact surface including a threaded part, the method comprising the steps of:
   forming a Zn—Ni alloy plated layer in an electrolytic plating process on the contact surface of at least one of the pin and the box with no blasting treatment performed, the contact surface being ground surface with an arithmetic average roughness of the contact surface defined as Ra2; and
   forming a solid lubricant coating on the Zn—Ni alloy plated layer with no blasting treatment performed,
   wherein:
   the Zn—Ni alloy plated layer contains 10 to 16 mass % of Ni and has an arithmetic average roughness Ra1 of the Zn—Ni alloy plated layer ranging from 0.1 to 3.2 μm, wherein the arithmetic average roughness Ra1 is more than the arithmetic average roughness Ra2,
   where, the arithmetic average roughness Ra1 is measured under a laser microscope along a direction in which the contact surface is ground, and the arithmetic average roughness Ra2 is measured under the laser microscope along the grinding direction.

6. The method for producing a threaded connection for pipe according to claim 5, wherein the contact surfaces each further include a non-threaded metal contact part.

* * * * *